United States Patent [19]

Baacke et al.

[11] Patent Number: 4,564,512
[45] Date of Patent: Jan. 14, 1986

[54] PROCESS FOR THE PRODUCTION OF COARSE PARTICLE MORDENITE

[75] Inventors: Michael Baacke; Peter Kleinschmit, both of Hanau, Fed. Rep. of Germany

[73] Assignee: Degussa Aktiengesellschaft, Frankfurt, Fed. Rep. of Germany

[21] Appl. No.: 432,294

[22] Filed: Oct. 1, 1982

[30] Foreign Application Priority Data

Nov. 21, 1981 [DE] Fed. Rep. of Germany ....... 3146153
Apr. 1, 1982 [DE] Fed. Rep. of Germany ....... 3212106

[51] Int. Cl.$^4$ ............................................. C01B 33/28
[52] U.S. Cl. .................................... 423/328; 423/329; 502/78
[58] Field of Search ....................... 423/328, 329, 118; 502/78

[56] References Cited

U.S. PATENT DOCUMENTS

| | | | |
|---|---|---|---|
| 3,436,174 | 4/1969 | Sand | 423/328 |
| 3,714,366 | 1/1973 | Fukuda et al. | 423/328 |
| 3,849,463 | 11/1974 | Dwyer | 260/448 C |
| 4,081,514 | 3/1978 | Sand et al. | 423/328 |
| 4,205,052 | 5/1980 | Rollman et al. | 423/329 |

FOREIGN PATENT DOCUMENTS

| | | | |
|---|---|---|---|
| 0040104 | 11/1981 | European Pat. Off. | 423/328 |
| 1176106 | 8/1964 | Fed. Rep. of Germany | 423/328 |
| 2055476 | 5/1971 | Fed. Rep. of Germany | 423/328 |
| 71756 | 3/1970 | German Democratic Rep. | 423/328 |

OTHER PUBLICATIONS

Barrer, J. Chem. Soc. (1952) pp. 1561–1571.

Primary Examiner—William R. Dixon, Jr.
Assistant Examiner—Steven Capella
Attorney, Agent, or Firm—Cushman, Darby & Cushman

[57] ABSTRACT

There is produced coarse particle mordenite by treating a reaction mixture consisting essentially of on a molar basis 2.5–10 $Na_2O$, $Al_2O_3$, 15–30 $SiO_2$, 400–4000 $H_2O$, 5–30 NaCl in an autoclave at a temperature of 140° to 180° C. until formation of crystals separating the crystalline product, washing with water and drying.

1 Claim, 3 Drawing Figures

PARTICLE ANALYSIS
COULTER COUNTER

PROCESS FOR THE PRODUCTION OF COARSE PARTICLE MORDENITE

BACKGROUND OF THE INVENTION

Mordenite, when it is produced according to known processes has a predominant amount of particles in the size range of 6 to 12 μm. Therefore for its use as catalyst this powder must be formed into larger particles either in its production or subsequently (compare German Pat. No. 1,176,106 and German AS No. 2,055,476). Furthermore, it is known from Rollmann U.S. Pat. No. 4,205,052 to influence the crystal form of the mordenite during the crystallization by addition of organic compounds. The entire disclosure of Rollmann is hereby incorporated by reference and relied upon.

This known process has the disadvantage that it either requires further process steps or expensive materials.

SUMMARY OF THE INVENTION

The subject matter of the invention is a process for the production of coarse particles of mordenite which is characterized by treating a reaction mixture produced from aqueous aluminate liquid (sodium aluminate), silica, sodium chloride solution and water in an autoclave at a temperature of 140° to 180° C. until formation of crystals, separating the crystalline product, washing with water and drying.

The reaction mixture can have the composition on a molar basis of 2.5–10 $Na_2O$, $Al_2O_3$, 15–35 $SiO_2$, 400–4000 $H_2O$, 5–30 NaCl, especially 6.5 $Na_2O$, $Al_2O_3$, 30 $SiO_2$, 1400 $H_2O$, 20 NaCl.

Surprisingly the process of the invention with low cost starting materials leads to coarse particles of product (coarse grain product). The process depends on the addition of a large excess of NaCl at otherwise unchanged composition of the synthesis mixture. There can be used 5–30, preferably 20 moles, of NaCl per mole of $Al_2O_3$.

The addition of NaCl to the synthesis mixture has indeed already been described in Barrer, J. Chem. Sc. 1952 pages 1561 to 1571, but there were always obtained the industrially insignificant sodalite.

From Adv. Chem. Ser. Vol. 121, page 140 (1973) it is known that through the addition of NaCl to the crystallization mixture of zeolites there is attained a severely increased viscosity and therewith a drastic lowering of the speed of crystallization.

From Sand U.S. Pat. No. 4,081,514 it is known to produce mordenite having coarse particles in the presence of NaCl. However, thereby there are added on the one hand seed crystals and on the other coarse, amorphous $SiO_2/Al_2O_3$ particles which have the same size as the product particles. The entire disclosure of the Sand patent is hereby incorporated by reference and relied upon.

In contrast to Sand there is used in the process of the invention a reaction mixture which has no seed crystals or preformed particles.

By the addition of NaCl there is obtained a very good crystalline mordenite having particle size between 20 μm and 300 μm. The aggregate obtained thereby consists of crystallites firmly grown together.

In the process of the invention there can be used commercial aluminate of the composition (by weight) 50% $Al_2O_3$, 40% $Na_2O$, 10% $H_2O$ which is used in the form of its aqueous solution of any desired concentration.

As silica there can be employed precipitated silica or pyrogenically produced silica.

Coarse particles of mordenite obtained by means of the process of the invention can be employed, e.g. as catalysts in the isomerization of hydrocarbons or for the other uses of mordenite mentioned in the art cited above and in Breck, "Zeolite Molecular Sieves" published by John Wiley & Sons, New York, N.Y. (1974).

The process can consist essentially of the steps set forth and the materials employed can consist essentially of or consist of those mentioned.

The process of the invention will be explained in more detail by way of the following examples.

DETAILED DESCRIPTION

EXAMPLE 1

Figure 1:
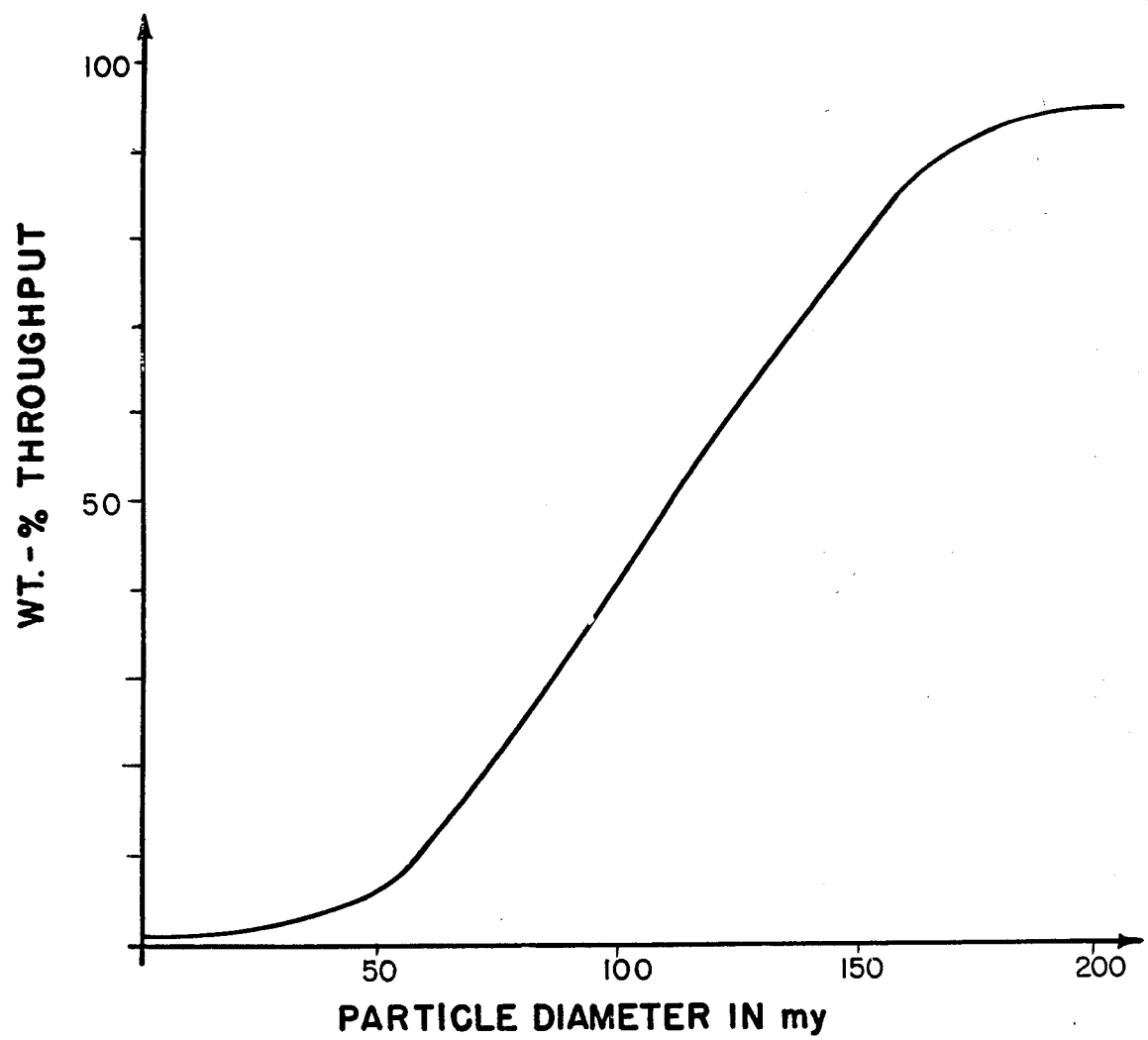
FIG. 1 is a graph of particle analysis with the throughput indicated on the X axis and particle diameter indicated on the Y axis.

7.5 grams of sodium aluminate (50% $Al_2O_3$, 40% $Na_2O$, 10% $H_2O$ by weight) were dissolved in 20 ml of $H_2O$ and added to a suspension of 75 grams of a precipitated silica (89% $SiO_2$ by weight) in a solution of 35.5 grams of NaCl and 15 grams of NaOH in 780 ml of $H_2O$. The thus produced mixture was stirred for 3 days at 150° C. in an autoclave, the crystalline product was separated off; washed with water and dried for 12 hours at 120° C. According to the X-ray diffraction diagram it was a good, crystalline mordenite whose particle size distribution using a Coulter-Counter is shown in FIG. 1.

EXAMPLE 2 (COMPARISON EXAMPLE)

The process of Example 1 was repeated with the difference that no NaCl was added. There was obtained as the product good crystallized mordenite.

A Coulter-Counter measurement is not possible because of the fineness of the product.

The difference in particle size can furthermore be gathered from the scanning electron microscope (SEM) picture.

Figure 2:
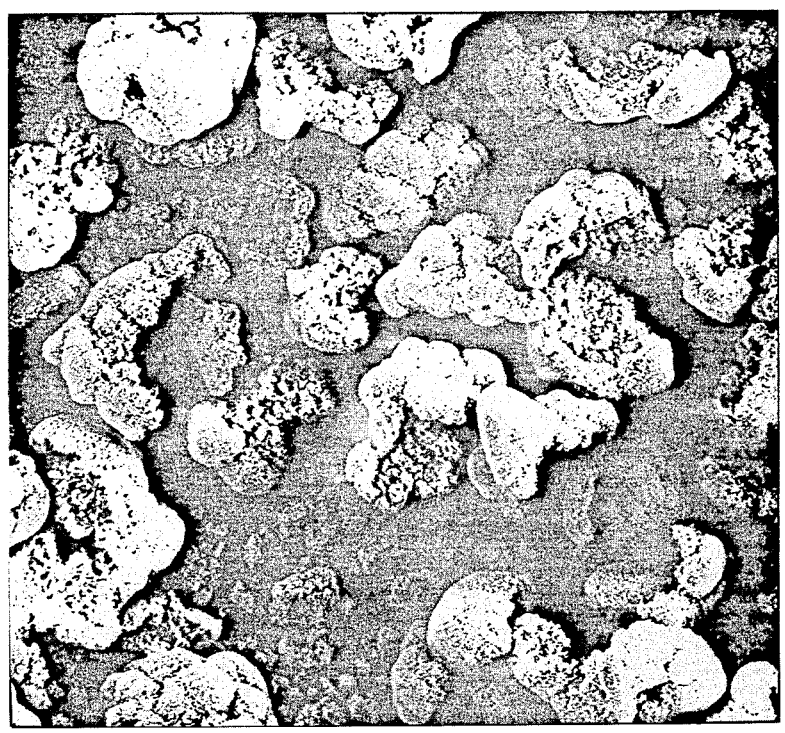
FIG. 2 is a photomicrograph of the particles produced in Example 1.
Figure 3:
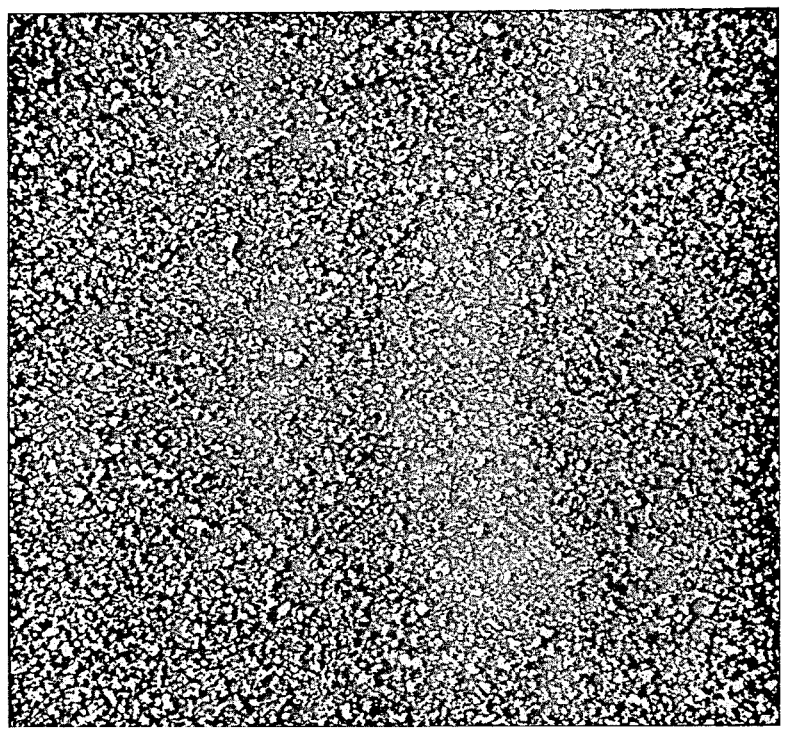
FIG. 3 is a photomicrograph of the particles produced in Example 2.

FIG. 2 shows the product of Example 1 under SEM and FIG. 3 shows the product of Example 2 under the SEM at the same magnification.

The entire disclosure of German priority application Nos. P3146153.0 and P3212106.7 are hereby incorporated by reference.

What is claimed is:

1. A process for the production of mordenite particles having a size between 20 μm and 300 μm consisting essentially of heating a reaction mixture consisting essentially of sodium aluminate, sodium chloride, and sodium hydroxide dissolved in water and silica suspended in the water, the reaction mixture having the composition 6.5 moles $Na_2O$, 1 mole $Al_2O_3$, 30 moles $SiO_2$, 1400 moles $H_2O$, and 20 moles NaCl to a temperature of 140° to 180° C. until the formation of mordenite crystals, separating off the crystalline product, washing and drying it.

* * * * *